US007202799B2

(12) United States Patent
Hsu et al.

(10) Patent No.: US 7,202,799 B2
(45) Date of Patent: Apr. 10, 2007

(54) REMOTE CONTROLLER

(75) Inventors: Ya-Hsun Hsu, Taipei (TW); Chang-Chin Lai, Taipei (TW)

(73) Assignee: Inventec Corporation (TW)

( * ) Notice: Subject to any disclaimer, the term of this patent is extended or adjusted under 35 U.S.C. 154(b) by 275 days.

(21) Appl. No.: 10/935,815

(22) Filed: Sep. 7, 2004

(65) Prior Publication Data

US 2006/0049958 A1 Mar. 9, 2006

(51) Int. Cl.
*G08C 19/00* (2006.01)
*G05B 19/02* (2006.01)

(52) U.S. Cl. ............................ 340/825.72; 340/825.22

(58) Field of Classification Search ........... 340/825.72, 340/825.22

See application file for complete search history.

(56) References Cited

U.S. PATENT DOCUMENTS 6,104,334 A * 8/2000 Allport .................. 340/825.72
6,133,847 A * 10/2000 Yang ..................... 340/825.72
6,791,467 B1 * 9/2004 Ben-Ze'ev ............. 340/825.72
2002/0171396 A1 * 11/2002 Pettinato ..................... 320/111
2003/0156053 A1 * 8/2003 Wall et al. ............. 340/825.72
2004/0257259 A1 * 12/2004 Jindal .................... 340/825.69
2005/0078087 A1 * 4/2005 Gates et al. ................ 345/163

* cited by examiner

*Primary Examiner*—Wendy R. Garber
*Assistant Examiner*—Clara Yang
(74) *Attorney, Agent, or Firm*—Peter F. Corless; Steven M. Jensen; Edwards Angell Palmer & Dodge LLP

(57) ABSTRACT

A remote controller accesses via a connection control data from an appliance to be controlled. The remote controller includes a connection interface, a control unit, an input keypad and a remote signal output unit. When a user intends to remotely operate the appliance, first the connection interface needs to be inserted to a connection slot of the appliance, allowing the control unit to read the control data for remotely controlling the appliance. Then, when the user uses the input keypad to operate a function of the appliance, the control unit transmits an operational instruction from the input keypad and the control data to the remote signal output unit where a control command is generated and transmitted to the appliance such that the appliance can execute the function corresponding to the control command.

7 Claims, 1 Drawing Sheet

REMOTE CONTROLLER

FIELD OF THE INVENTION

The present invention relates to wireless control devices, and more particularly, to a remote controller that allows a user through an interface connection to directly access internal control data from a device to be controlled.

BACKGROUND OF THE INVENTION

As the electronic technology and fabrication technique advance, various electric appliances designated wit multimedia and multi-functionality have been provided. In order to comply with users' or consumers' operational habits, manufacturers have focused on developing humanized operation interfaces such as multi-linguistic operation interface, patterned selection interface, or sound operation indication functions, etc.

Besides the humanized operation interface or other additional functions, most of the manufacturers also provide a remote-control function for their products for sale so as to allow the users or consumers to benefit by the advanced technology. Such function further plays an important role for most of the users in determining if to purchase the products.

In fact, due to strong competition among the manufacturers and continuous changes of the users' expenditure trends, the manufacturers need to keep developing new functions for the products to bring forth the new and maintain their products on the market not out of date.

However, since the products made by different manufacturers have dedicated remote controllers thereof, and a single manufacturer provides various electric appliances with different specifications and functions, there result in plenty of various kinds of products having different specifications and functions for sale on the market. Even the electric appliances having the same use may be made with diverse specifications. For example of television, if a user has a television made by manufacture A, its remote controller from manufacture A normally does not work to control a television made by manufacture B. Moreover, since many electric appliances are currently used in a home such as television, air conditioner, DVD player, CD hi-fi, etc. each provided with a dedicated remote controller, this situation would confuse and cause inconvenience to the user, for example, using a wrong remote controller to operate the electric appliance or easily losing any of the remote controllers.

In light of the above problems, there have been disclosed the following solutions. Firstly, a code input method is to input control data of products from various manufacturers that are relatively more commonly used to a single remote controller, such that the user can input a code of the product to be controlled to the remote controller every time so as to record and operate the product. Secondly, a semi-automatic scanning method is to aim a remote controller at an electric appliance to be controlled and to consecutively press the On/Off button of the remote controller to output different frequency signals until the electric appliance generates a responsive On/Off action so as to record and operate the electric appliance. However, the above two methods not only require long time to obtain the responsive frequency but also are not suitable for all remote controllers from different manufacturers. In other words, since the same manufacturer may have a plurality of codes, it thus complicates the setting process and causes inconvenience in searching, and also an operation panel of the remote controller should be added with many switch buttons for more manufacturer specifications. In light of these drawbacks, Taiwanese Patent No. 558035 ("TW 558035" hereinafter) discloses a multi-functional remote controller for rapid automatic code search. The multi-function remote controller comprises a central processor having a plurality of memory devices, which store a plurality of frequencies at which a variety of electronic appliances manufactured by various manufacturers can operate; for example, the twenty-six letters of the English alphabet, alone or in combination, are used to indicate the various manufacturers. Search address and codes of various products from the manufacturers are stored in a main memory and a second memory of the central processor, allowing a large amount of data to be categorized and then stored in the main memory and the second memory individually, such that the searching speed can be greatly increased and the operating time would be reduced. Therefore, TW 558035 employs a relatively more regular arrangement manner to store the corresponding remote-control frequencies of electric appliances from various manufacturers in the remote controller so as to overcome the prior-art drawback of difficulty in searching the control frequency and thereby raise the code-searching speed. However, TW 558035 still has a drawback that it lacks flexibility in use as being unable to be updated with the types of appliances. In other words, if the control frequencies of future-developed electric appliances are not collected in the remote controller, these electric appliances cannot be operated using the remote controller; thus, there is no real-time updating method for the remote controller to obtain the latest control frequencies. Therefore, the problem to be solved here is to provide a remote controller suitable for all digital electric appliances and capable of updating control frequencies in real time.

SUMMARY OF THE INVENTION

In light of the above drawbacks in the prior art, an objective of the present invention is to provide a remote controller that can be electrically connected via a connection interface to a digital electric appliance to be remotely controlled so as to read control data from the electric appliance, without causing any problem of compatibility between the remote controller and the electric appliance.

Another objective of the present invention is to provide a remote controller that can update control data stored therein by a connection to a digital electric appliance via a connection interface so as to quickly obtain a remote-control frequency of the electric appliance.

In order to achieve the above and other objectives, the present invention proposes a remote controller comprising: (1) a connection interface for being connected to a digital electric appliance so as to read internal control data from the electric appliance; (2) an input means acting as an operation interface for a user to remotely operate the electric appliance to execute functions; (3) a control unit for recognizing the control data read via the connection interface and generating a control signal according to an operational instruction input through the input means, the control unit further comprising a USB control module, a memory module, and a recognizing module installed with recognition software; and (4) a remote signal output unit for outputting a control command to the electric appliance corresponding to the control signal generated from the control unit.

BRIEF DESCRIPTION OF THE DRAWINGS

The present invention can be more fully understood by reading the following detailed description of the preferred embodiments, with reference made to the accompanying drawing, wherein.

DETAILED DESCRIPTION OF THE PREFERRED EMBODIMENT

Figure 1:
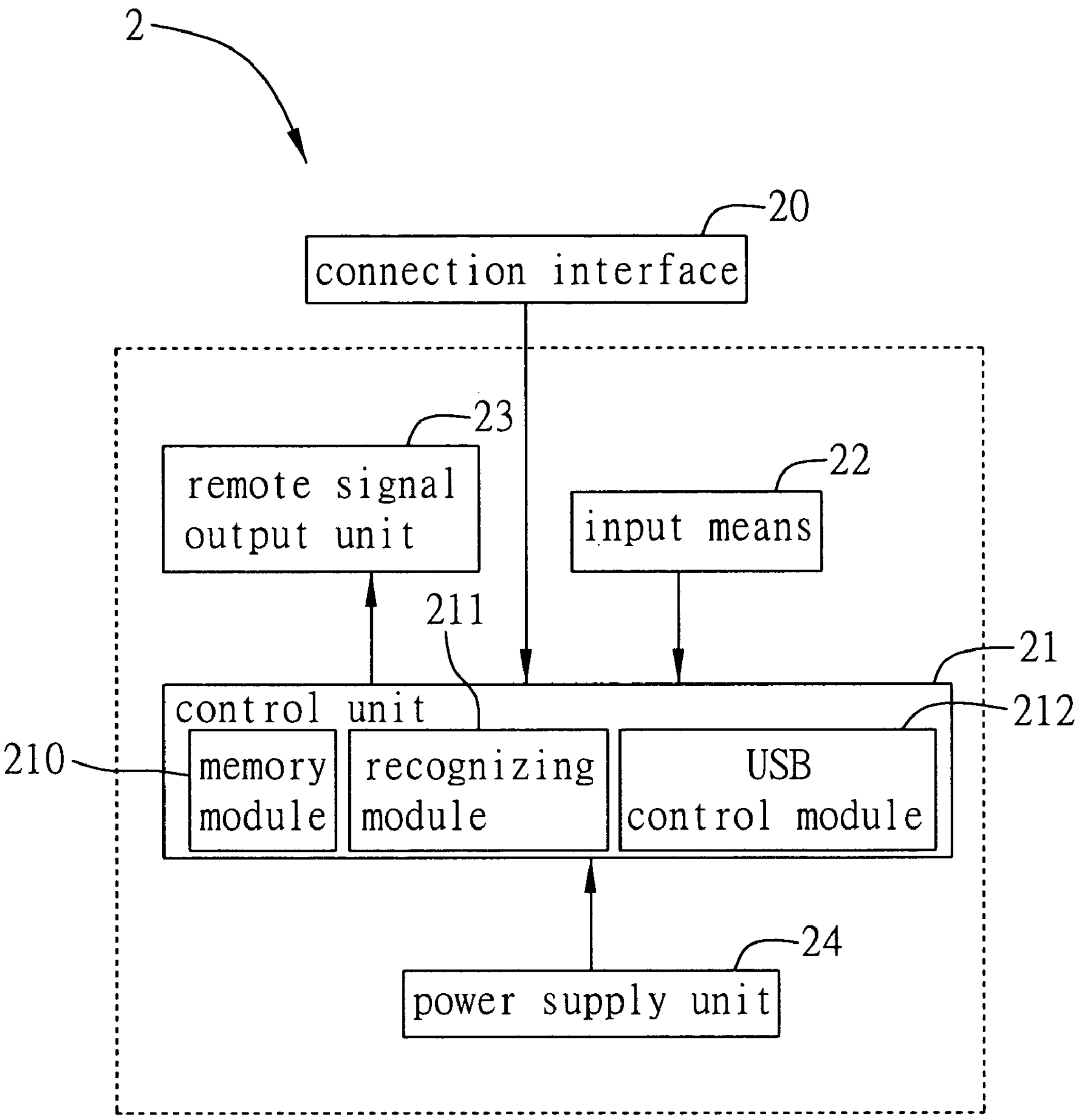
FIG. 1 is a block diagram showing an internal structure of a remote controller according to the present invention.

In the following preferred embodiment of the present invention, a proposed remote controller is described along with a notebook computer for controlling operation of the notebook computer. However, it should be noted that the remote controller is not limited to the use with the notebook. More specifically, the remote controller in the present invention can be applied to any digital electric appliance having a Universal Serial Bus (USB) slot, such as desktop computer, television, etc.

FIG. 1 shows an internal structure of the remote controller 2 according to the present invention. The remote controller 2 is here used to remotely control the operation of a notebook computer (not shown). As shown in FIG. 1, the remote controller 2 has a casing externally mounted with a connection interface 20 (such as a USB plug). Inside the casing, the remote controller 2 further comprises a control unit 21, an input means 22 (such as a keypad comprising a plurality or buttons), a remote signal output unit 23 (such as a wireless radio frequency output module) electrically connected to the control unit 21, and a power supply unit 24. The control unit 21 is electrically connected to the connection interface 20 and the input means 22. The control unit 21 further includes a memory module 210 for storing control data of the notebook computer or other digital electric appliances; a USB control module 212 for controlling the connection interface 20 to perform data transmission; and a recognizing module 211 for recognizing the control data and generating a corresponding control signal. The recognizing module 211 is farther provided with recognition software for processing the control data of the digital electric appliances. In this embodiment, the notebook computer is exemplified as the digital electric appliance to be controlled by a user. First, the user inserts the connection interface 20 mounted on remote controller 2 to a USB slot (not shown) of the notebook computer. The power supply unit 24 (such as a chargeable battery) in the remote controller 2 can be charged by power supplied from public electricity or the notebook computer. This charging action simultaneously actuates the control unit 21 to allow its recognizing module 211 to read control data (such as control codes, control parameters or control frequency) internally stored in the notebook computer 1. The recognizing module 211 transmits all the collected control data to the recognition software for analyses and operations so as to integrate these data into control information required by the remote controller 2 for function execution, and the control information is stored in the memory module 210. When the user intends to remotely operate the notebook computer 1, he or she can input an operational instruction via the input means 22 to select a function to be executed by the notebook computer. The operation signal input through the input means 22 is received and analyzed by the control unit 21 to obtain an operation command representing the operational instruction. Then, the control unit 21 retrieves the control data for the notebook computer from the memory module 210, and integrates the operation command and the control data into a control signal that is then transmitted to the remote signal output unit 23. Thereafter, the remote signal output unit 23 transmits the control signal to the notebook computer via a wireless radio frequency technique, such that the control signal serves as a control command for the notebook computer to execute the corresponding function selected by the user.

Similarly, to operate any other digital electric appliances having USB slots via the remote controller 2, the above processes can be simply repeated that first the connection interface 20 is inserted to the digital electric appliance to establish an electrical connection and read control data from the digital electric appliance. The recognition software transforms the obtained control data into control information corresponding to the digital electric appliance and stores the control information in the memory module 210. Moreover, to operate digital electric appliances with different uses via the remote controller 2, a switch key (not shown) provided in the input means 22 can be actuated to switch the operations between the different digital electric appliances e.g. a television and studio appliances.

The development of electric appliances is increasingly incorporated with the digital technology to render computer data compatible with the electric appliances such that the electric appliances can provide more humanized operational functions as the computer does. Currently popular liquid crystal television and plasma television are successful examples of digital household appliances. In order to be compatible with digital video cameras or digital photo cameras, the liquid crystal television and the plasma television can be further provided with connection interface slots of various specifications, such as IEEE 1394, USB, and various memory card slots, etc. Thereby, photos taken by the digital camera can be displayed on the liquid crystal television or the plasma television. In case the electric appliance is to be used along with the computer, the electric appliance must have a connection interface slot compatible with the computer and have the relevant software and hardware to perform data interchange with the computer or to be controlled by the computer to allow mutual integration. Therefore, the remote controller in the present invention is electrically connected to the digital electric appliance via the connection interface (such as a USB plug) to quickly accesses the control data from the digital electric appliance, so as to remotely control and operate functions of the digital electric appliance.

The invention has been described using the exemplary preferred embodiment. However, it is to be understood that the scope of the invention is not limited to the disclosed embodiment. On the contrary, it is intended to cover various modifications and similar arrangements. The scope of the claims, therefore, should be accorded the broadest interpretation so as to encompass all such modifications and similar arrangements.

What is claimed is:

1. A remote controller for remotely controlling operation of a digital electric appliance, the remote controller comprising:

a connection interface connectible to the digital electric appliance so as to read control data from the digital electric appliance via the connection interface;

an input means comprising a plurality of buttons selectable by a user to input an instruction for control of the digital electric appliance;

a control unit electrically connected to the connection interface and the input means, the control unit accessing the control data and generating a control signal according to the input instruction and the control data;

a remote signal output unit electrically connected to the control unit, the remote signal output unit outputting a control command corresponding to the control signal so as to remotely control the operation of the digital electric appliance; and a power supply unit, which is chained by electric power supplied by the digital electric appliance when the connection interface is connected to the digital electric appliance, wherein the control unit is actuated to access the control data and generates the control signal as soon as the power supply unit is charged by the electric power supplied by the digital electric appliance.

2. The remote controller of claim 1, wherein the connection interface is a USB (Universal Serial Bus) plug.

3. The remote controller of claim 1, wherein the control unit includes a USB control module.

4. The remote controller of claim 1, wherein the control unit includes a memory module stored with the control data retrieved from the digital electric appliance.

5. The remote controller of claim 1, wherein the control unit includes a recognizing module, which recognizes the control data and generates the control signal.

6. The remote controller of claim 5, wherein the recognizing module is provided with recognition software.

7. The remote controller of claim 1, wherein the remote signal output unit is a wireless radio frequency output module.

* * * * *